United States Patent
Yamaguchi

[11] Patent Number: 6,101,095
[45] Date of Patent: Aug. 8, 2000

[54] HEAT DISSIPATING STRUCTURE FOR ELECTRONIC TERMINAL DEVICE

[75] Inventor: Masahiro Yamaguchi, Yokohama, Japan

[73] Assignee: Matsushita Electric Industrial Co., Ltd., Osaka, Japan

[21] Appl. No.: 09/262,052

[22] Filed: Mar. 4, 1999

[30] Foreign Application Priority Data

Mar. 9, 1998 [JP] Japan .................................. 10-074929

[51] Int. Cl.⁷ .................................................... H05K 7/20
[52] U.S. Cl. ........................ 361/720; 361/687; 361/690; 361/694; 361/695; 361/704; 361/707; 361/721; 174/15.1; 174/16.1; 174/16.3; 165/80.3; 165/185
[58] Field of Search ..................... 361/687–690, 361/694, 695, 702–704, 707, 713, 714, 719–721; 174/16.1, 16.3; 165/80.2, 80.3, 185, 104.33; 312/223.2

[56] References Cited

U.S. PATENT DOCUMENTS

| | | | |
|---|---|---|---|
| 5,424,913 | 6/1995 | Swindler | 361/687 |
| 5,440,450 | 8/1995 | Lau et al. | 361/695 |
| 5,559,675 | 9/1996 | Hsieh et al. | 361/707 |
| 5,694,294 | 12/1997 | Ohashi et al. | 361/687 |
| 5,768,102 | 6/1998 | Ma | 361/695 |
| 5,793,609 | 8/1998 | Donahoe et al. | 361/695 |

*Primary Examiner*—Leo P. Picard
*Assistant Examiner*—Boris L. Chervinsky
*Attorney, Agent, or Firm*—Louis Woo

[57] ABSTRACT

A heat dissipating structure for an information terminal device such as an electronic cash register includes a substrate mount chassis having a heat dissipating portion. The substrate mount chassis has disposed in a chamber thereof a substrate. The substrate is arranged in the chamber of the substrate mount chassis and has disposed thereon an electronic component such as a high-speed CPU which generates a relatively large amount of heat. A heat conducting member such as a silicone rubber is disposed between the CPU and the heat dissipating portion in contact therewith for dissipating the heat generated by the CPU into the surrounding atmosphere.

9 Claims, 6 Drawing Sheets

HEAT DISSIPATING STRUCTURE FOR ELECTRONIC TERMINAL DEVICE

BACKGROUND OF THE INVENTION

1. Technical Field of the Invention

The present invention relates generally to an information terminal device, and more particularly to an improved heat dissipating structure of an information terminal device for dissipating heat generated by electronic components to the surrounding atmosphere.

2. Background Art

Japanese Patent First Publication No. 3-36615 discloses a radiator for emitting radiant heat produced by electronic components installed in a computer module. The computer module consists of a metallic casing within which a single substrate having disposed thereon a CPU, memories, a control circuit, etc. is mounted. The metallic casing is closed by a cover and has disposed between the CPU and the cover a plate made of a metallic material exhibiting a high thermal conductivity.

Usually, electronic cash registers use a large number of electronic components. Their performance depends upon how thermal energy of the electronic components, especially a high-speed CPU producing a large quantity of heat, is radiated into the surrounding atmosphere. The radiator taught in the above publication is not sufficient for dissipating heat generated by the high-speed CPU, etc. The use of a cooling fan also causes dust contained in the surrounding air to be suck into the device, thus contributing a malfunction of the device.

SUMMARY OF THE INVENTION

It is therefore a principal object of the present invention to avoid the disadvantages of the prior art.

It is another object of the present invention to provide an improved heat dissipating structure for an information terminal device which is capable of dissipating heat generated by electronic components into the surrounding air effectively.

According to one aspect of the present invention, there is provided an information terminal device. The information terminal device comprises: (a) a substrate mount having a mount chamber; (b) a heat dissipating portion; (c) a substrate mounted in the mount chamber of said substrate mount which has disposed thereon an electronic component generating the heat; (d) a heat conducting member disposed between the electronic component on said substrate and the heat dissipating portion in contact therewith. The heat dissipating portion dissipates at least part of the heat generated by the electronic component by transferring the generated heat through said heat conducting member into a surrounding atmosphere.

In the preferred mode of the invention, a cooling device is further provided which is connected to said heat dissipating portion to dissipate the heat through said heat conducting member into the surrounding atmosphere.

The mount chamber of said substrate mount is formed with a box-like chassis which has an opening and in which said substrate is disposed. The cooling device includes a chassis cover which covers the opening of the box-like chassis and which has the heat dissipating portion formed therein.

The heat dissipating portion may be curved inward of the mount chamber to form a recess exposed to air surrounding said substrate mount. The cooling device may alternatively include a cooling fan disposed in the recess for dissipating the heat transferred from the electronic component to the heat dissipating portion through the heat conducting member.

The cooling device may alternatively include a heat sink disposed in the recess for dissipating the heat transferred from the electronic component to the heat dissipating portion through the heat conducting member.

The chassis mount has a peripheral wall which defines the mount chamber and which has the heat dissipating portion. The electronic component is mounted on a first surface of said substrate exposed to the heat dissipating portion. A second electronic component which generates an amount of heat smaller than that generated by said electronic component is mounted on a surface of a second substrate facing a second surface of said substrate opposite the first surface.

The substrate mount is formed with a box-like chassis which has an opening and in which said substrate is disposed. The opening is closed by a chassis cover to shield said substrate.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
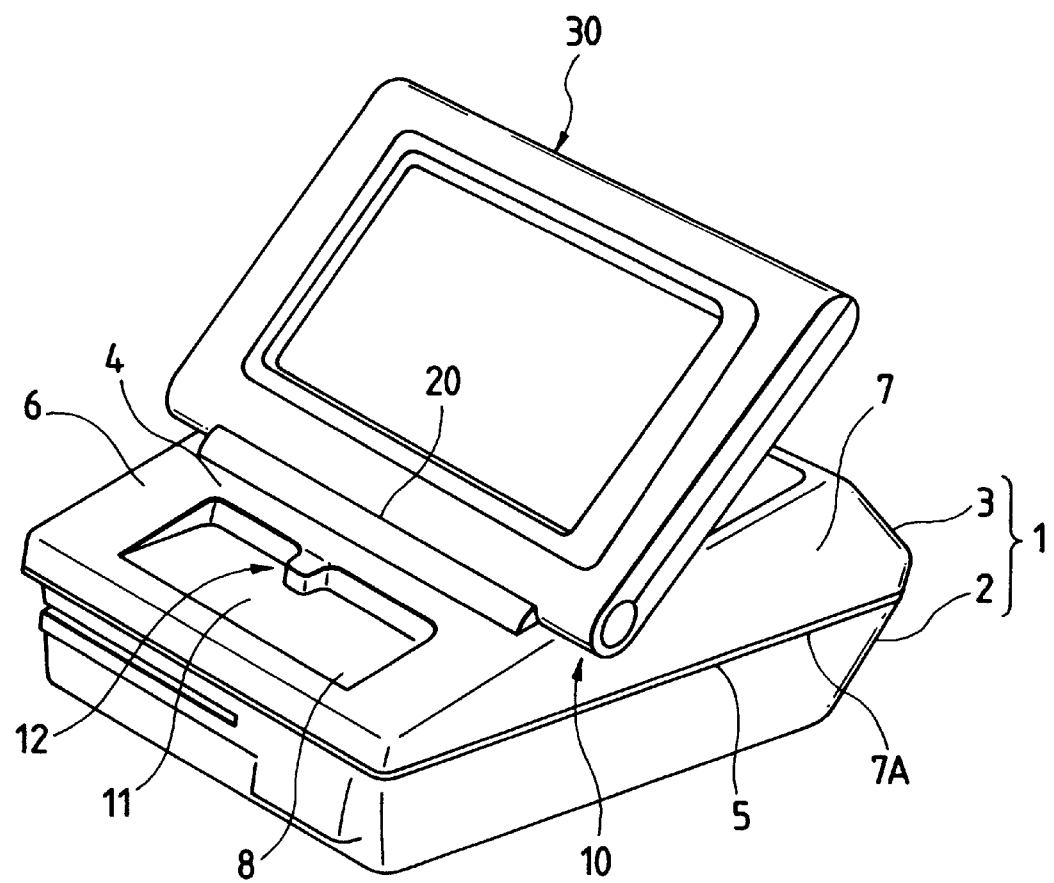
FIG. 1 is a perspective view which shows an electronic cash register having a heat dissipating structure according to the present invention.

Referring now to the drawings, wherein like numbers refer to like parts in several views, particularly to FIG. 1, there is shown an information terminal device or electronic cash register having a heat dissipating structure according to the present invention which includes a housing 1 consisting of a lower casing 2 and an upper casing 3. The lower casing 2 has formed on the bottom thereof a chassis mount (not shown) having an opening. The lower casing 2 has an engaging portion 5 formed on an upper edge.

The upper casing 3 includes an upper wall 6 and a side wall 7 surrounding the periphery of the upper wall 6. The side wall 7 has an engaging portion 7A formed on a lower edge thereof. The upper wall 6 has formed thereon a bill holder 8, a pen holder 4, a bearing assembly (not shown), and a display mount 10. The lower casing 2 and the upper casing 3 are joined in tight engagement of the engaging portion 5 with the engaging portion 7A. On the display mount 10, a display 30 is so secured that it can be tilted manually.

Figure 2:
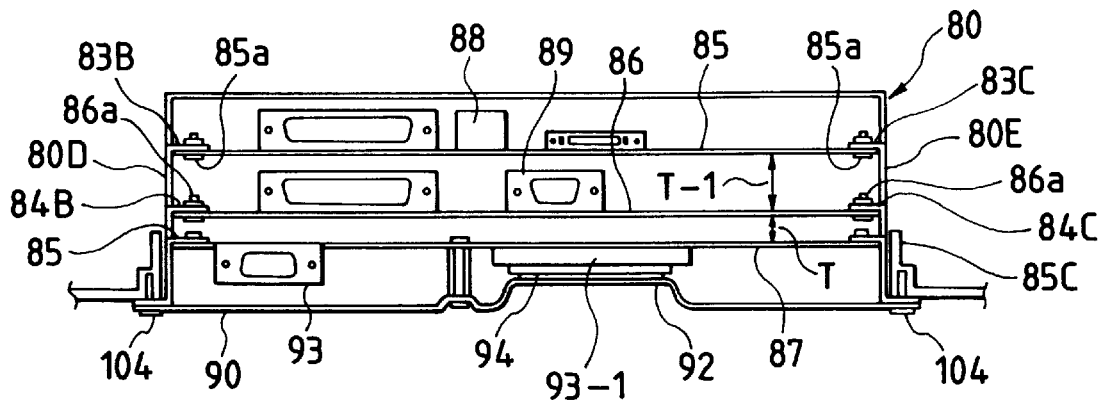
FIG. 2 is a cross sectional view of the electronic cash register in FIG. 1.
Figure 8:
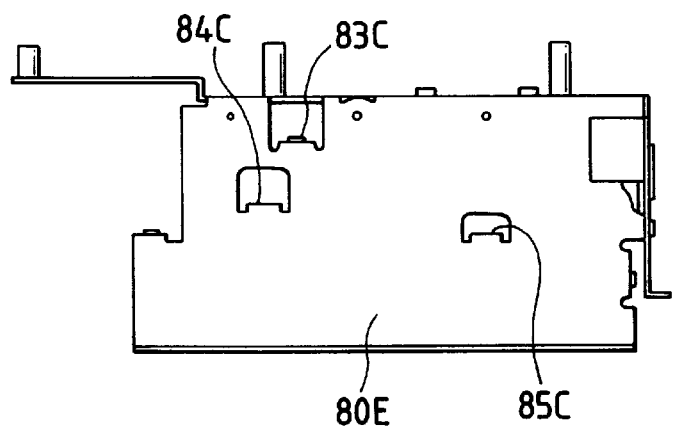
FIG. 8 is a rear view as viewed from an arrow C in FIG. 6
Figure 9:
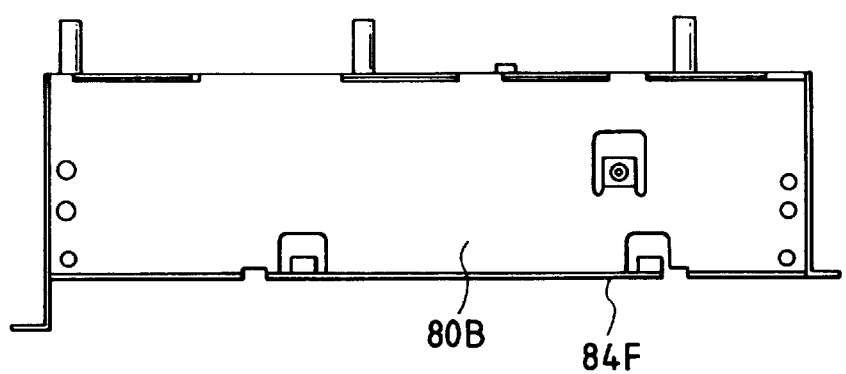
FIG. 9 is a side view as viewed from an arrow D in FIG. 6.
Figure 10:
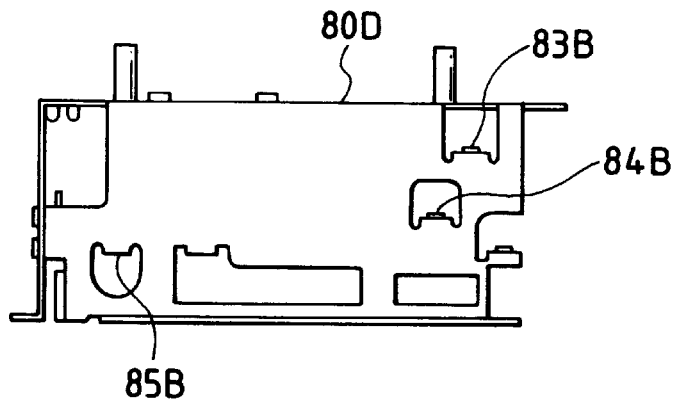
FIG. 10 is a front view as viewed from an arrow E in FIG. 6.
Figure 11:
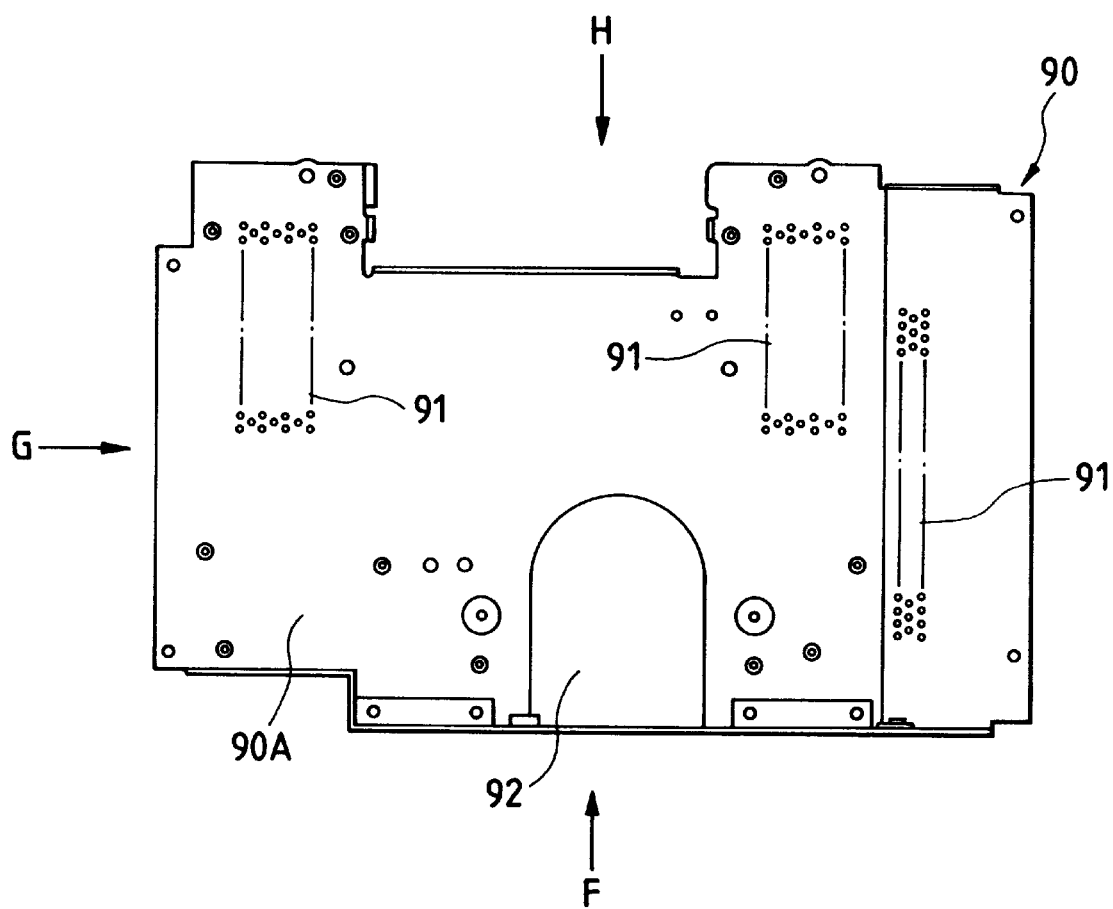
FIG. 11 is a plan view which shows a chassis cover.
Figure 12:
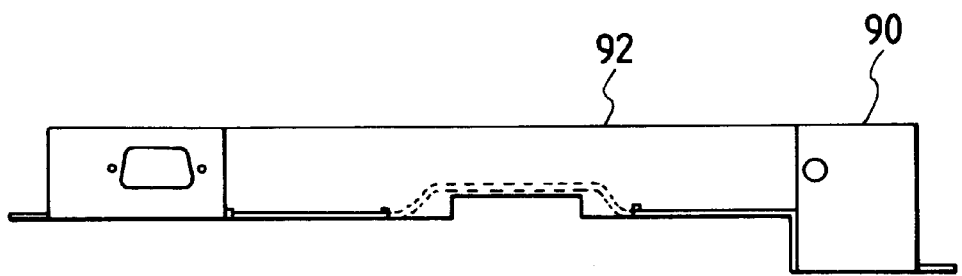
FIG. 12 is a side view as viewed from an arrow F in FIG. 11.
Figure 13:
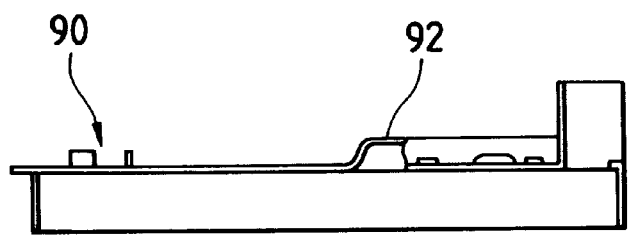
FIG. 13 is an end view as viewed from an arrow G in FIG. 11.
Figure 14:
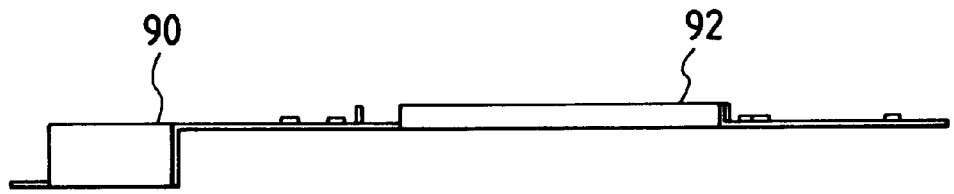
FIG. 14 is a side view as viewed from an arrow H in FIG. 11.

On the chassis mount of the lower casing 2, a chassis 80, as shown in FIG. 2, is installed which is made from aluminum and which also serves as a shield. A chamber 102 is formed by chassis 80, as chassis 80 includes, as shown in FIGS. 2 to 10, an upper wall 80A, right and left walls 80B and 80C, and front and rear walls 80D and 80E and opens at the bottom. The upper wall 80A has, as shown in FIG. 6, mount flanges 81 and 82 on left and right edges thereof. The front wall 80D has, as shown in FIG. 10, substrate mount seats 83B, 84B, and 85B arranged vertically. Each of the substrate mount seats 83B, 84B, and 85B is formed by cutting a portion of the front wall 80D and bending it horizontally inwardly. Similarly, the rear wall 80E has, as shown in FIG. 8, substrate mount seats 83C, 84C, and 85C at the same levels as those of the substrate mount seats 83B, 84B, and 85B of the front wall 80D. The front and rear walls 80D and 80E, as shown in FIG. 6, have cover mount flanges 84D and 84E formed on lower edges, respectively. Similarly, the left side wall 80B, as shown in FIG. 9, has a cover mount flange 84F formed at a lower edge thereof.

The chassis 80 is, as clearly shown in FIG. 2, covered at the bottom by a chassis cover 90. The chassis cover 90, as shown in FIGS. 11 to 14, includes a cover body 90A which is made from aluminum and which serves as a shield. The cover body 90A has a plurality of thermal radiation holes 91 and a heat conducting protrusion or a heat dissipation portion 92 serving to dissipate heat. The heat conducting protrusion 92 projects inwardly of the chassis 80 and has depressions formed in an outer surface thereof. A thermal conducting pad 94 made from a silicone rubber (e.g., a gap filler T174), as shown in FIG. 2, is mounted on the upper surface of the heat conducting protrusion 92.

A first substrate 85 is, as clearly shown in FIG. 2, mounted on the substrate mount seats 83B and 83C using screws 85a. A second substrate 86 is mounted on the substrate mount seats 84B and 84C using screws 86a. Similarly, a third substrate 87 is mounted on the substrate mount seats 85B and 85C.

The first substrate 85, having one and an other surfaces, has a plurality of electronic components 88 disposed on an upper surface or one of the one and other surfaces thereof. Similarly, the second substrate 86, having one and other surfaces has a plurality of electronic components 89 disposed on an upper or one of the one and other surfaces, surface thereof. The third substrate 87; having one and an other surfaces, has a plurality of electronic components 93 including, for example, a high-speed CPU 93-1 generating a relatively large quantity of heat disposed on a lower surface or one of the one and other surfaces thereof within the space between the third substrate 87 and the chassis cover 90. This allows the interval T, as shown in FIG. 2, between the second and third substrates 86 and 87 to be smaller than the interval T-1 between the first and second substrates 85 and 86, thereby resulting in a reduction in overall size of the chassis 80.

The chassis 80 is, as clearly shown in FIG. 2, closed at the bottom by the chassis cover 90 being in engagement with the cover mount flanges 84D and 84E using screws 104 so as to urge the thermal conducting pad 94 disposed on the upper surface of the heat conducting protrusion 92 of the chassis cover 90 against the lower surface of the high-speed CPU 93-1 for transferring the heat generated by the CPU 93-1 outside of the chassis 80 through the chassis cover 90. Specifically, the chassis cover 90 serves as a cooling device which dissipates the heat transferred from the CPU 93-1 to the heat conducting protrusion 92 through the thermal conducting pad 94 into the surrounding atmosphere.

The first, second, and third substrates 85, 86, and 87 are shielded by the chassis 80 and the chassis cover 90 for avoiding the penetration of an electronic or magnetic field. The chassis 80 is mounted at the mount flanges 81 and 82 on the chassis mount of the lower casing 2 of the housing 1.

Figure 3:
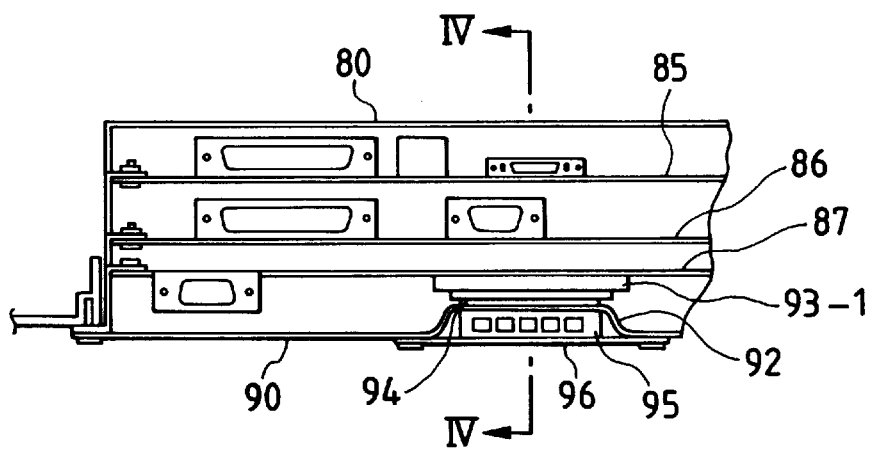
FIG. 3 is a partially cross sectional view which shows a cooling fan disposed on a chassis cover.
Figure 4:
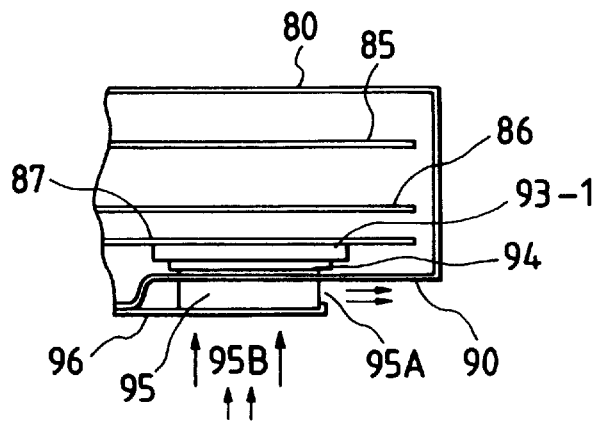
FIG. 4 is a partially cross sectional view taken along the line IIII—IIII in FIG. 3.

A heat dissipating device 95 such as a cooling fan, as shown in FIGS. 3 and 4, may be installed beneath the heat conducting protrusion 92 by a holder plate 96 secured on the chassis cover 90. The heat dissipating device 95 sucks fresh air, as indicated by arrows 95B in FIG. 4, and discharges air warmed by the heat transferred to the heat conducting protrusion 92 from the CPU 93-1 to the outside through an opening 95A formed between the chassis cover 90 and the holder plate 96.

Figure 5:
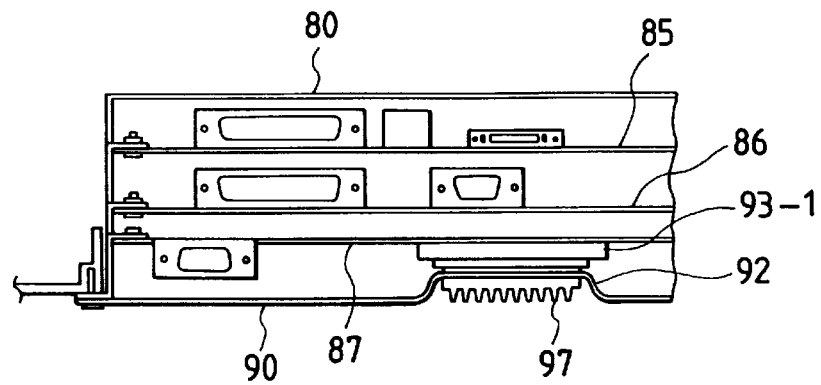
FIG. 5 is a partially cross sectional view which shows a heat sink disposed on a chassis cover.
Figure 6:
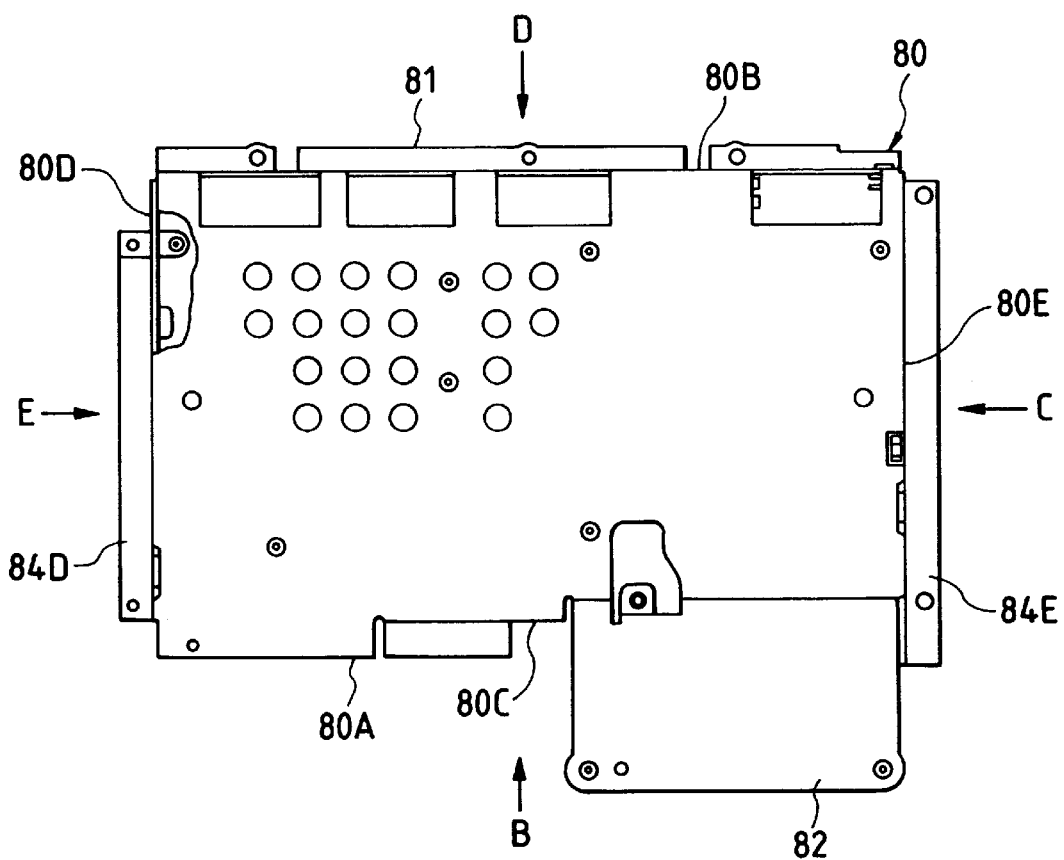
FIG. 6 is a plan view which shows a chassis.
Figure 7:
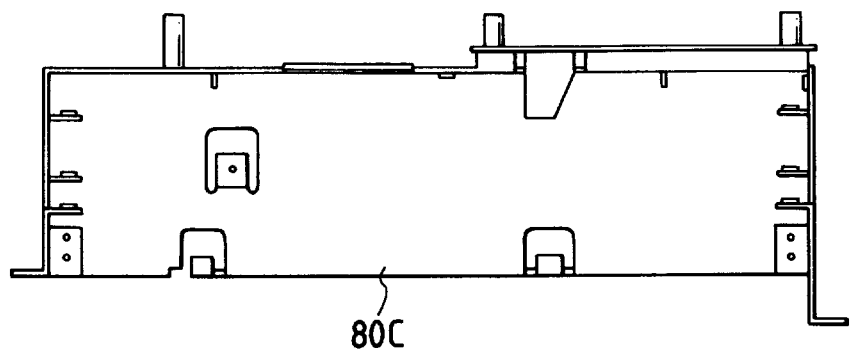
FIG. 7 is a side view as viewed from an arrow B in FIG. 6.

A heat sink 97, as shown in FIG. 5, may alternatively be attached at the bottom thereof to the back surface of the heat conducting protrusion 92. The heat sink 97 is made from aluminum and has fins for dissipating the heat generated by the CPU 93-1 into the surrounding atmosphere.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An information terminal device comprising:

a substrate mount including a box-like chassis having an opening closed by a chassis cover, said box-like chassis defining therein a mount chamber;

a heat dissipating portion formed on the chassis cover, said heat dissipating portion being curved inward of the mount chamber to form a recess exposed to air surrounding said substrate mount;

a substrate mounted in the mount chamber of said substrate mount, said substrate having disposed thereon an electronic component which generates heat;

a heat conducting member disposed between and in contact with the electronic component on said substrate and the heat dissipating portion;

wherein said heat dissipating portion dissipates at least part of the heat generated by the electronic component and transferred thereto through said heat conducting member into a surrounding atmosphere.

2. An information terminal device as set forth in claim 1, further comprising a cooling device connected to said heat dissipating portion to dissipate the heat transferred thereto through said heat conducting member into the surrounding atmosphere.

3. An information terminal device as set forth in claim 2, wherein said cooling device includes a cooling fan disposed in the recess for dissipating the heat transferred from the electronic component to the heat dissipating portion through the heat conducting member.

4. An information terminal device as set forth in claim 2, wherein said cooling device includes a heat sink disposed in the recess for dissipating the heat transferred from the electronic component to the heat dissipating portion through the heat conducting member.

5. An information terminal device as set forth in claim 1, wherein said chassis mount has a peripheral wall which defines the mount chamber and which includes the heat dissipating portion, wherein the electronic component is mounted on one surface of said substrate exposed to said heat dissipating portion, and wherein a second electronic component which generates an amount of heat smaller than that generated by said electronic component is mounted on one surface of a second substrate facing an other surface of said substrate opposite said one surface.

6. An information terminal device as set forth in claim 1, wherein the chassis cover is made of a thermally conducting material which serves as a shield.

7. An information terminal device as set forth in claim 6, wherein the chassis cover is made of aluminum.

8. An information terminal device as set forth in claim 1, wherein said heat conducting member is made of an elastic material which establishes elastic contact between the electronic component on said substrate and said heat dissipating portion.

9. An information terminal device as set forth in claim 8, wherein said heat conducting member is made of silicon rubber and is mounted on a surface of said heat dissipating portion.

* * * * *